(12) United States Patent  (10) Patent No.: US 6,717,587 B2
Felser et al.  (45) Date of Patent: Apr. 6, 2004

(54) POSITIONING AND ALIGNMENT AIDS FOR SHAPE OBJECTS HAVING AUTHORABLE BEHAVIORS AND APPEARANCES

(75) Inventors: Lawrence David Felser, Ithaca, NY (US); John Rogers Wallace, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/839,386

(22) Filed: Apr. 20, 2001

(65) Prior Publication Data

US 2001/0015730 A1 Aug. 23, 2001

Related U.S. Application Data

(63) Continuation of application No. 09/088,116, filed on Jun. 1, 1998, now Pat. No. 6,232,983.

(51) Int. Cl.[7] ................................................. G06F 3/00
(52) U.S. Cl. ....................................................... 345/630
(58) Field of Search ................................. 345/630, 651, 345/652, 659, 677, 678, 964; 700/182; 706/919; 707/502

(56) References Cited

U.S. PATENT DOCUMENTS

| 5,444,836 | A |   | 8/1995 | Hollingsworth et al. |
| 5,490,241 | A |   | 2/1996 | Mallgren et al. |
| 5,513,309 | A |   | 4/1996 | Meier et al. |
| 5,564,004 | A |   | 10/1996 | Grossman et al. |
| 5,627,949 | A |   | 5/1997 | Letcher, Jr. |
| 5,633,955 | A |   | 5/1997 | Bozinovic et al. |
| 5,704,028 | A |   | 12/1997 | Shanel et al. |
| 5,760,774 | A |   | 6/1998 | Grossman et al. |
| 5,808,625 | A | * | 9/1998 | Picott et al. ................ 345/440 |
| 5,894,310 | A |   | 4/1999 | Arsenault et al. |
| 5,900,874 | A |   | 5/1999 | Shrader et al. |
| 6,219,056 | B1 | * | 4/2001 | Felser et al. ................ 345/355 |
| 2001/0024207 | A1 | * | 9/2001 | Dhimitri et al. ............ 345/630 |

* cited by examiner

Primary Examiner—Michael Razavi
Assistant Examiner—G. F. Cunningham
(74) Attorney, Agent, or Firm—Gates & Cooper LLP

(57) ABSTRACT

An intelligent shape is displayed in conjunction with a CAD application program, wherein the intelligent shape selectively displays positioning and alignment aids on the monitor of the computer to assist a user in operating one or more functions of the host application program. When invoked, the intelligent shape displays plugs and sockets related to the shapes on the monitor and aids the user in positioning, aligning, rotating, and connecting shapes together.

33 Claims, 13 Drawing Sheets

POSITIONING AND ALIGNMENT AIDS FOR SHAPE OBJECTS HAVING AUTHORABLE BEHAVIORS AND APPEARANCES

This application is a Continuation of application Ser. No. 09/088,116, filed Jun. 1, 1998, entitled "POSITIONING AND ALIGNMENT AIDS FOR SHAPE OBJECTS HAVING AUTHORABLE BEHAVIORS AND APPEARANCES", which application is incorporated herein by reference. Now U.S. Pat. No. 6,232,983 issued May 15, 2001.

BACKGROUND OF THE INVENTION

1. Field of the Invention

The present invention relates generally to graphical user interfaces, and in particular, to a method, apparatus, and article of manufacture for providing positioning and alignment aids for software objects with authorable behaviors and appearances for computer programs having a graphical user interface.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user connect standard CAD components, such as shapes and other objects, in the CAD document.

Many standard components have several connection points that can connect to other components. Typically, if a user wants to connect components together, the user must drag the components onto the working screen, and subsequently use toolbar accessed functions to move the component, rotate the component, or size the component in order to create a finished document or graphical presentation.

This multiple step approach of dragging the components onto the screen and then modifying the components to create a drawing is inefficient and time consuming. Further, the process is not easily learned by a user, and prevents many users from utilizing the CAD program to its fullest extent.

Consequently, there is a need in the art for improved techniques for connecting components in a CAD program, in order to create documents faster. Further, there is a need in the art for improved techniques for connecting components in a CAD program that eliminates the need for accessing toolbar or menu functions.

SUMMARY OF THE INVENTION

To address the requirements described above, the present invention discloses a method, apparatus, and article of manufacture for executing intelligent shape programming in a computer within a CAD application program, wherein the intelligent shape programming selectively displays informational aids associated with a displayed shape on the monitor of the computer to assist a user in manipulating the shape while operating one or more functions of the CAD application program. When invoked, the intelligent shape programming displays plugs and sockets on the monitor related to the selected shape and the target shape, and aids the user in connecting the selected shape to the target shape.

This instruction is accomplished by the intelligent shape programming executing a predefined sequence of steps to perform the selected task. The intelligent shape programming also monitors the user's interaction with the CAD application program during execution of the sequence of steps.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-assisted drafting (CAD) program that provides intelligent shape objects, wherein the intelligent shape objects include plugs and sockets for automatically connecting associated shape objects together whenever the associated shape objects are displayed in proximity to one another on a monitor of a computer.

Hardware Environment

Figure 1:
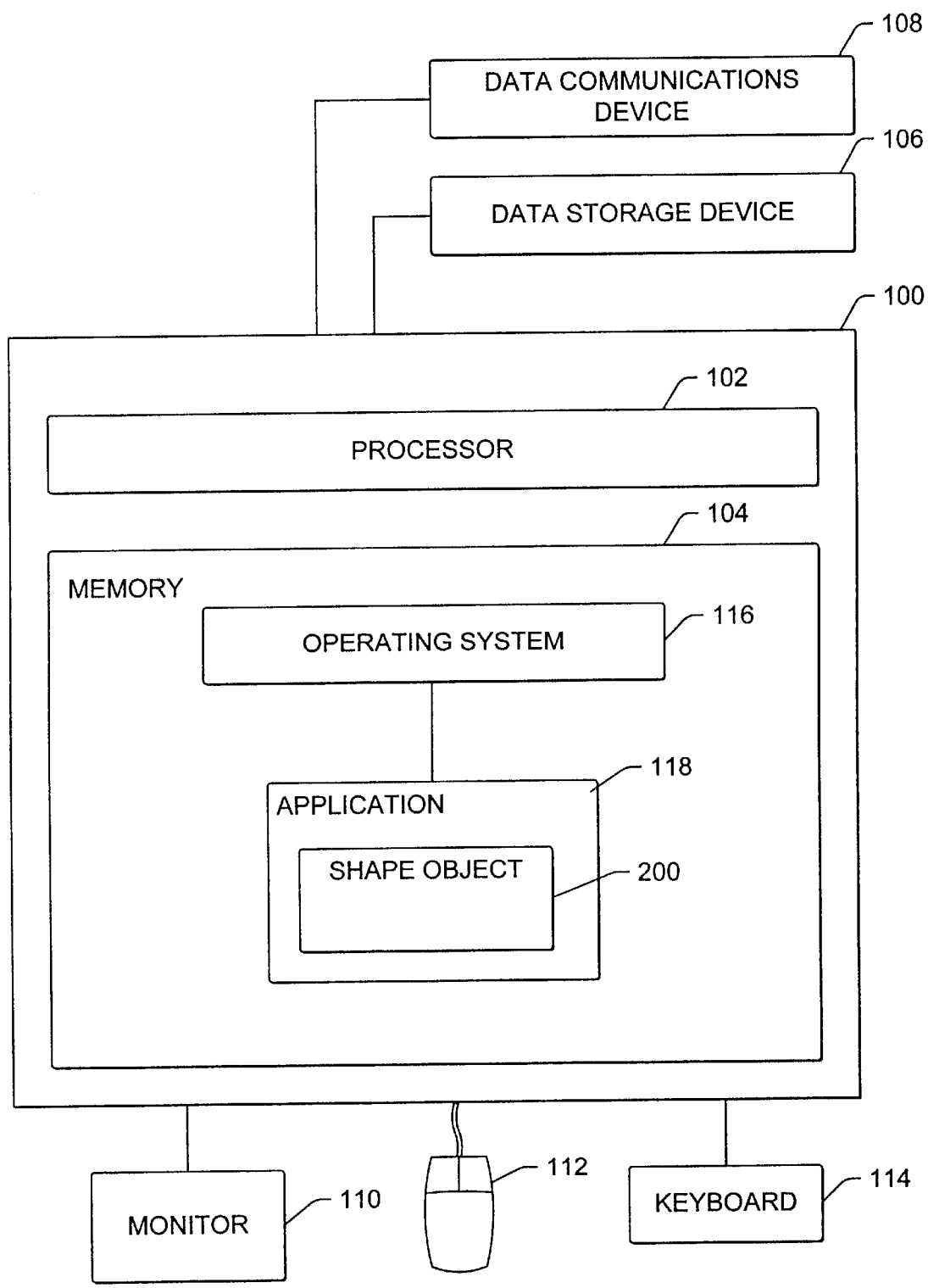
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In the preferred embodiment, the application program 118 provides one or more intelligent shape objects 200.

Generally, the application program 118 and intelligent shape objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-read able device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Intelligent Shape Objects

Figure 2:
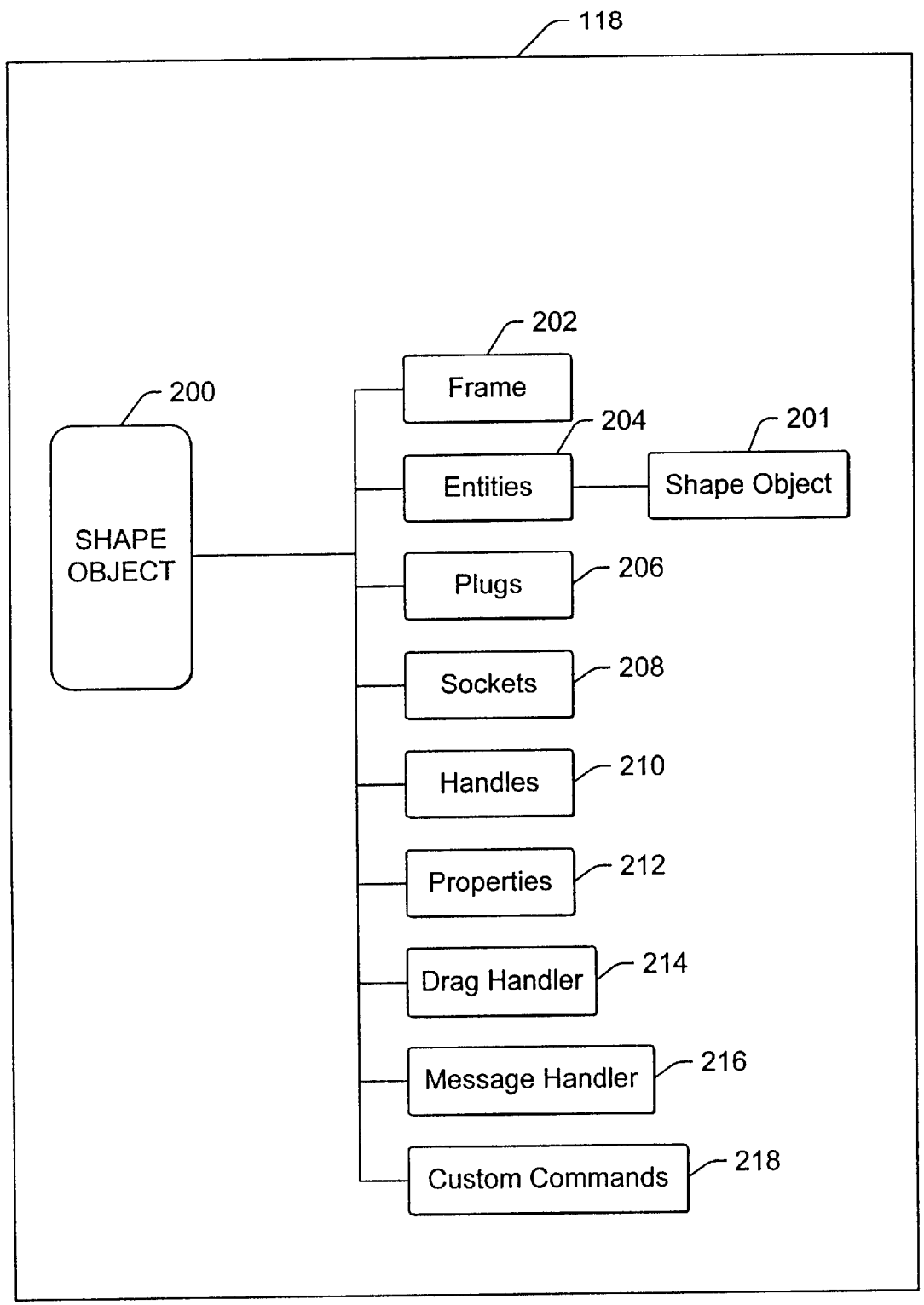
FIG. 2 illustrates the components of a shape object of the present invention.

FIG. 2 is a block diagram that illustrates the components of an intelligent shape object 200 according to the present invention. The intelligent shape object 200 is comprised of a number of different elements: (1) a spatial frame 202 that provides the underlying structure and spatial mapping for the intelligent shape object 200; (2) an entities collection 204 that includes one or more objects of geometry along with one or more other (subordinate) shape objects 201 that together make up the (superordinate) shape object 200; (3) one or more plugs 206 and sockets 208 that provide connectivity to other shape objects 200; (4) one or more handles 210 that provide direct manipulation of the shape object 200, thereby allowing the user to stretch or otherwise resize the shape object 200; (5) a properties collection 212 that contains all other properties of the shape object 200, including those defined by authors of the shape object 200; (6) a drag handler 214 that defines the behavior of the shape object 200 while the shape object 200 is being dragged; (7) a message handler 216 that defines the behavior of the shape object 200 when the shape object 200 receives system level commands or inputs; and (8) a custom command collection 218 that allows the user to define custom commands for the shape object 200. The frame 202, the entities 204, the plugs 206, the sockets 208, the handles 210, the properties 212, the drag handler 214, the message handler 216, and the custom commands 218 may be imbued with data and logic that add intelligence to the shape object 200, in order to provide added convenience to the user.

Example Shape Object

As an example, consider a shape object 200 that describes a chair. Such a shape object 200 has a geometry, which describes the paths used to render the appearance of the chair on a page. The shape object 200 may be composed of geometry that describes the chair's support members, with sub-shapes making up the seat, back, arms and other elements (and each of those shapes have their own properties, geometry, and so on). The chair may be modular, taking optional wheels, arms, and levers, each of which connects via plugs 206 and sockets 208. The chair may come in two or three sizes, any of which may be invoked by dragging handles. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, plugs 206, sockets 208, handles 210, and properties 212 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the shape object 200 to a particular space, notably the document page coordinate space. The frame 202 is a property of the shape object 200, and as such is under the control of the author of the shape object 200, e.g., the Visual Basic for Applications™ (VBA) programmer, and anyone else with access to the shape properties.

The frame 202 of a shape object 200 exposes a geometric framework to which the elements of the shape object 200 can be attached via expressions. The frame 202 also serves as a superstructure that relates all the other objects, some of which may be non-geometric, within the shape object 200. In addition, the frame 202 characterizes the spatial aspect of the shape object 200 as a whole, to allow the interpretation of methods such as Move, Rotate and Mirror. Finally, the frame 202 provides the mapping, if any, between the inside of the shape object 200 and the outside of the shape object 200.

Several types of frames 202 can be envisioned: line frames, rectangular frames, scaling rectangle frames, and polar frames.

A line frame 202 provides a frame 202 for a line shape object 200 that has a start point and an end point. The user can modify the start or end point and manipulate the start and end points of the line.

A scaling rectangle frame 202 provides a frame for a shape object 200 that expands and shrinks in size, e.g., a custom-built desktop should expand or shrink to fit a space exactly. The internal geometry of the shape object 200 is scaled as the user expands or shrinks the shape object 200 on the monitor of the computer.

A polar frame 202 provides a frame for a shape object 200 that always expands or shrinks in both dimensions proportionally. Other types of frames are also possible with the present invention.

Entities Collection

The entities collection 204 stores a set of one or more entities for a given shape object 200. Most shape objects 200 require geometry for rendering the shape object's 200 appearance. The entities collection 204 holds the geometry that makes up the shape object 200, e.g, a shape object 200 that represents a tire would contain two concentric circles, and therefore two objects in the entities collection 204. In addition, the entity 204 can hold other shape objects 200 to fully define the shape object 200. A complex shape object 200 may comprise several entities 204, each of which may store some geometry as well as particular related sub-shape objects 200.

Plugs and Sockets

The plugs 206 and sockets 208 enable geometric and logical connections between shape objects 200. Plugs 206 enable one side of the connection, and sockets 208 enable the other side. Plugs 206 and sockets 208 can be designed to accept any type of mating connectors, or specific types of connectors, much like electrical plugs and sockets 208 used in a home to distinguish between 110VAC and 220VAC connections. For example, a deluxe chair shape object 200 may contain sockets 208 that accept only deluxe plugs 206 to disallow mating less expensive seats, backs, and arms to the deluxe chair shape object 200.

Handles

The handles 210 are points located within the shape object 200 that are exposed to the user interface (UI) when the shape object 200 is selected. Handles 210 allow direct manipulation of geometry within the shape object 200, as well as any other shape object 200 parameter of collection element that can be referenced via expressions.

Properties

The properties 212 are other custom properties defined by the shape object 200 author not contained within the frame 202, handles 210, plugs 206, and sockets 208. For example, custom properties 212 can be a manufacturer code (a string), a price (a currency value) or a coefficient of friction for a given material. Properties 212 can also be defined for intermediate or scratch values within a shape object 200.

The Drag Handler

The shape object 200 contains objects that handle messages and the behavior of the shape object 200. The shape object 200 contains an object that, for example, handles the shape object's 200 drag and drop behavior. This object is known as the drag handler 214. The drag handler 214 can be customized or initially authored by a user, which enables a user to change the actions performed by the shape object 200 upon entering the program as well as the shape object's 200 interactions with other shape objects 200.

The Message Handler

The shape object 200 also contains an object that handles messages passed down from the containing system. This object is called the message handler 216. The message handler 216, like the drag handler 214, can be customized or initially authored by a user, which enables a user to change the actions performed by the shape object 200 in response to keyboard, mouse, and other system events.

Custom Commands

In addition to the above, each shape object 200 has custom commands 218 that can be programmed by the user. These custom commands 218 are accessed by the user by using a context menu, typically accessed by using the right hand button on a mouse pointing device 112. For example, the chair shape object 200 described above may have a custom command 218 associated with it to include a solid back on the shape object 200, or a carved back, or a padded seat, etc., depending on the desires of the user.

Plugs and Sockets as Positioning and Alignment Aids

In the preferred embodiment, the plugs 206 and sockets 208 are objects owned by shape objects 200 that assist the user in positioning the shape objects 200 relative to one another. The plugs 206 and sockets 208 are highlighted portions of the shape object 200 that have orientation, direction, and other programmable properties that allow for directed interaction between shape objects 200 within a document.

For example, when connecting two shape objects 200 together, the plugs 206 and sockets 208 automatically position the shape object 200 being dragged so that one shape object 200 connects to another properly. No rotation or flip tools, typically dragged from a toolbar, are required; the plug 206 and socket 208 properties automatically rotate and/or flip the shape object 200 to fit properly with adjoining shape objects 200. Thus, a drawing can be created by "snapping" or "gluing" together several various predefined components, e.g., squares, lines, text boxes, etc., where the plugs 206 and sockets 208 assist the user by showing the user which connections are proper, which connections are improper, and orienting and positioning each shape object 200 for the user. This automatic orientation and positioning makes creation of drawings and textual materials simpler and less time consuming.

Further, users can define their own shape objects 200, with custom definitions for plugs 206 and sockets 208, to fit specific applications. An editor utility is used to define shape objects 200, plugs 206, and sockets 208. The editor utility can be graphical in nature, or can allow the user to directly write software code instructions to edit the plugs 206, sockets 208, and other shape object 200 properties.

Operation of the Plugs and Sockets

FIGS. 3A–3I are "snapshots" of the plugs 206 and sockets 208 as displayed on the monitor 110 in one example of the operation of the preferred embodiment. These snapshots illustrate an exemplary sequence of events involving plugs 206 and sockets 208 within the present invention.

Figure 3A:
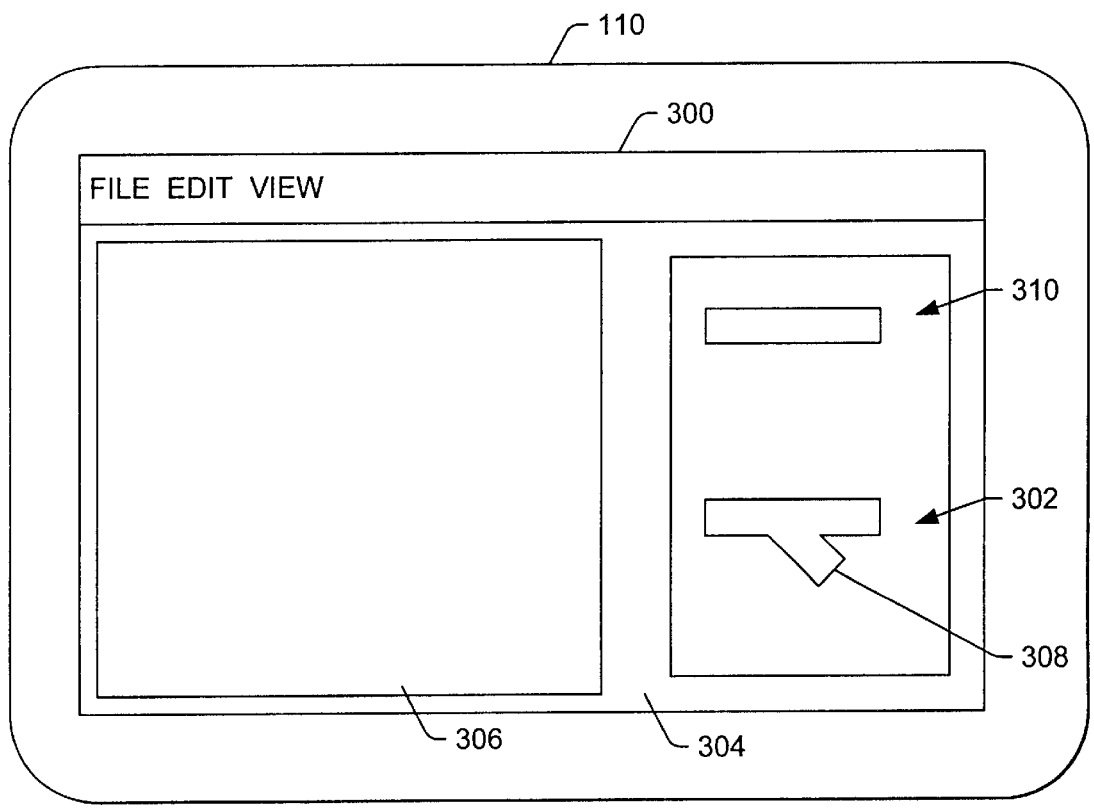
FIGS. 3A–3I are "snapshots" of the plugs and sockets displayed on the monitor 110 in one example of the operation of the preferred embodiment.

As shown in FIG. 3A, monitor 110 displays main window 300. Main window 300 contains several other subordinate windows, including library window 302, working space window 304, and working area 306. In this example, various shape objects 200 are brought from a library of shape objects 200 into a working space to create a graphical presentation. To create a document, a user drags a shape object 308 or 310 from library window 302 to working space window 304, and drops the shape object 308 or 310 onto a given spot within working area 306. This process is repeated for the various shape objects 308 or 310 that the user desires. Several shape objects 308 and 310 are illustrated in library window 302, including t-shaped duct 308 and straight duct 310; other shape objects 200 could be shown in library window 302 as well.

Figure 3B:
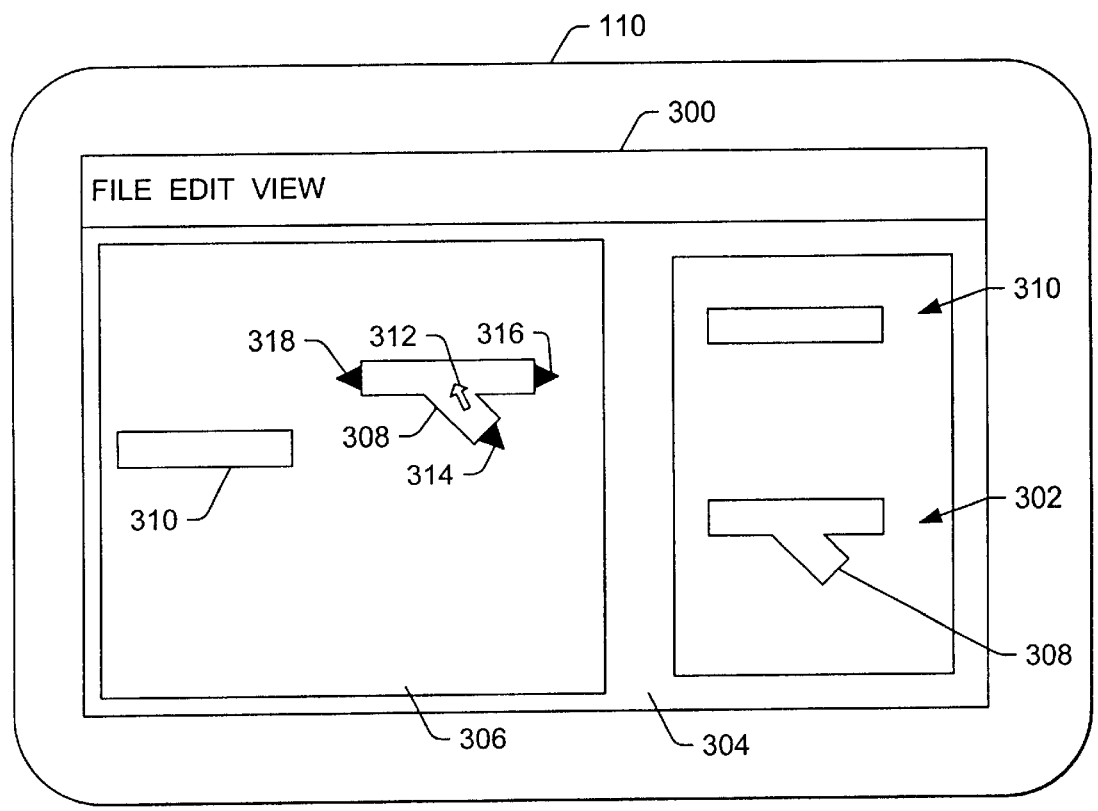

In FIG. 3B, straight duct 310 has been dragged and dropped from library window 302 to working area 306 and the t-shaped duct 308 is being dragged by cursor 312. As a user drags the t-shaped duct 308 from the library window 302 into the working space window 304, the plugs associated with the t-shaped duct 308 become selectively visible. The visibility and operability of the plugs can be programmed to operate selectively depending on the position of the cursor within t-shaped duct 308. The t-shaped duct 308, once dragged into working space window 304, displays arrowheads 314, 316, and 318 to illustrate to the user that these are the attachment points, or plugs, for the t-shaped duct 308.

Figure 3C:
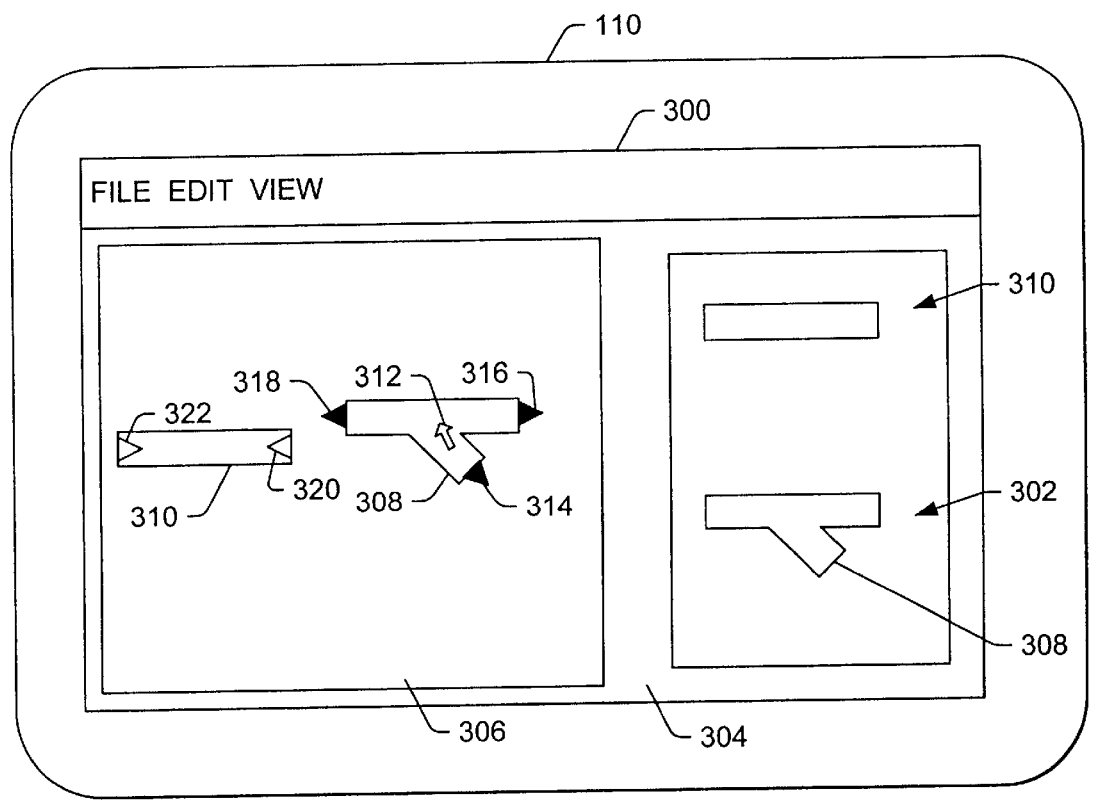

In FIG. 3C, as the t-shaped socket 308 is dragged spatially proximate to the straight duct 310 in the working area 306, sockets 320 and 322 are displayed on the straight duct 310. These sockets 320 and 322 illustrate to the user the attachment points for connecting the straight duct 310 to the t-shaped socket 308. The user can now see that straight duct 310 has multiple sockets for attachment to the t-shaped duct 308. The socket 320 or 322 can be defined to be fixed at a given point on the t-shaped duct 310, or can be defined to be active over a certain range of spatial proximity on the t-shaped duct 310. This is defined to be a "stretchable socket," because it allows a plug 314, 316, 318 to be glued to the socket 320,322 at various places, instead of one place, as shown in FIG. 3C.

Figure 3D:
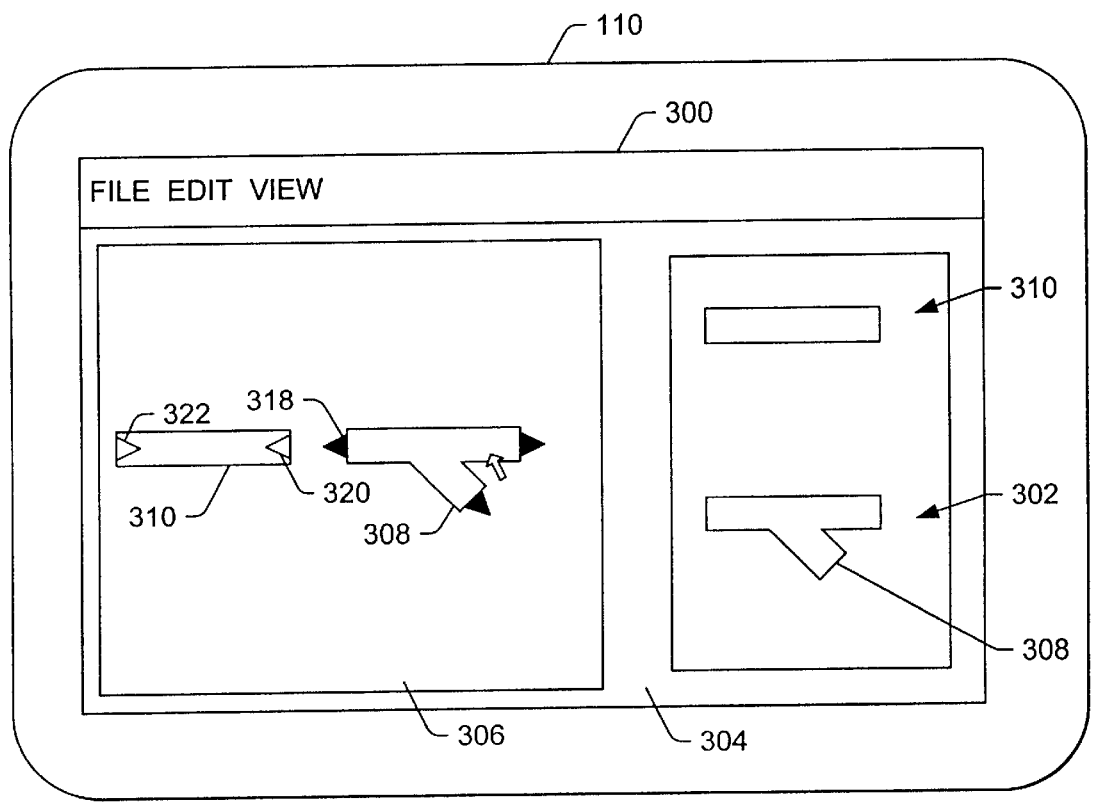

In FIG. 3D, as t-shaped duct 308 is dragged closer to straight duct 310, plug 318 changes appearance to indicate to the user that plug 318 is within range of a socket 320. In addition, socket 320 can also change appearance to indicate that socket 320, not socket 322, is the intended target for plug 318. The plug 318 and socket 320 can also change appearance if the plug 318 and socket 320 pairing is not compatible. For example, if the air flow in the ducts must flow in a certain direction, the plug 318 and socket 320 can indicate that they are incompatible by changing color, by stopping the display of either the plug 318 or socket 320, or by any other means to indicate to the user that that plug 318 socket 320 pair are not compatible with each other.

Figure 3E:
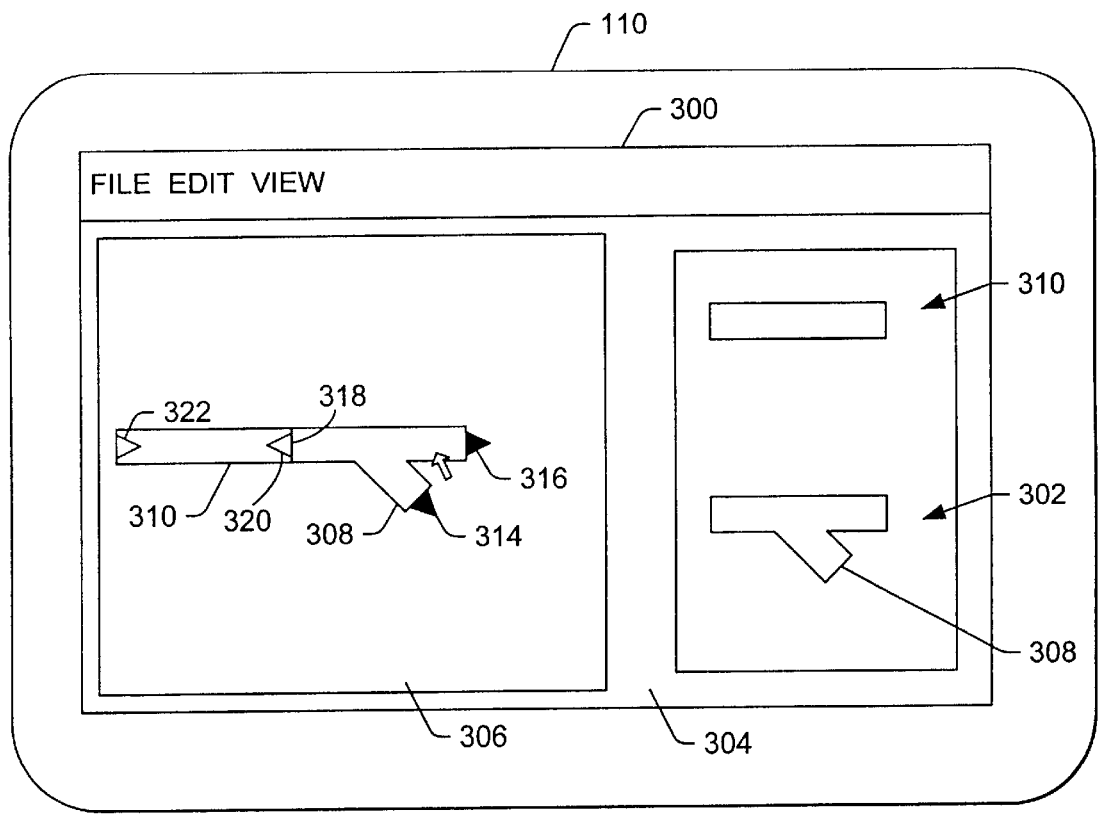

FIG. 3E shows t-shaped duct 308 "snapping" to straight duct 310. This automatic connection operation occurs if t-shaped duct 308 is left in spatial proximity to straight duct 310 for a sufficient period of time. Plug 318 and socket 320 are shown as indicating the joining or "gluing" of t-shaped duct 308 and straight duct 310. This indication can be a change of color for the plug 318 and socket 320, stopping the display of the plug 318 and socket 320, or any other means of indicating to the user that the two components 318, 320 are snapped or glued together. Once the two components 318, 320 are snapped or glued together, and all shape objects 308 and 310 have been de-selected, the plugs 314, 316, 318 and the sockets 320, 322 are no longer displayed on the monitor 110. Once t-shaped duct 308 and straight duct 310 are glued together, the user can drag straight duct 210 and t-shaped duct 308 will be dragged along, attached to straight duct 310. However, if the user drags the t-shaped duct 308, the t-shaped duct will detach from the straight duct 310. This example illustrates the unidirectional property of the gluing function.

Figure 3F:
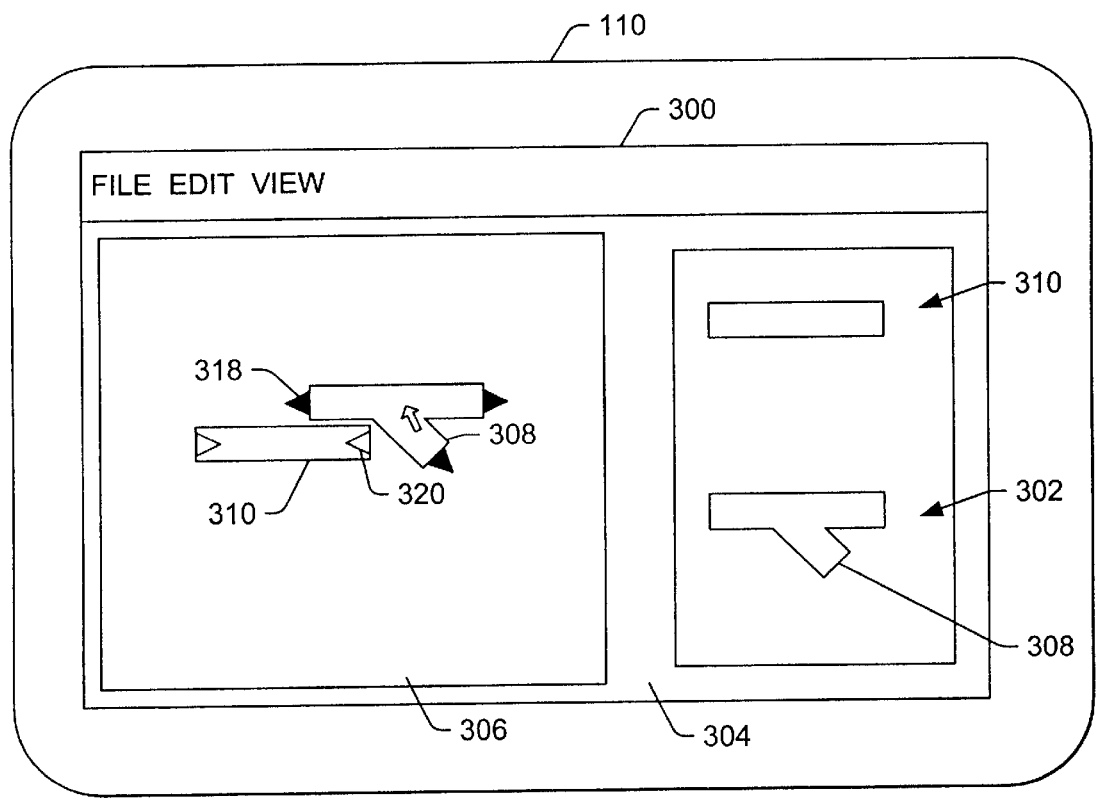

FIG. 3F shows the continued dragging of the t-shaped duct 308. As the user drags t-shaped duct 308 past socket 320 of straight duct 310, plug 318 changes appearance to indicate that plug 318 is no longer within range of socket 320.

Figure 3G:
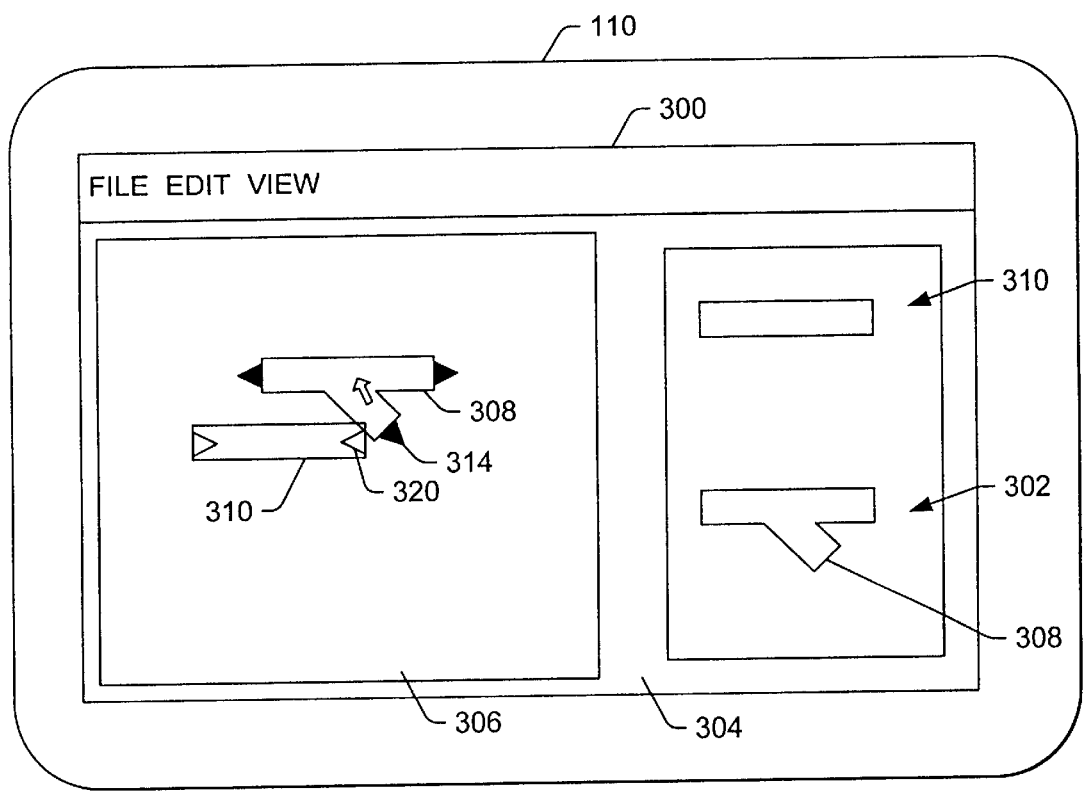

In FIG. 3G, as the user continues to drag t-shaped duct 308, such that plug 314 is spatially proximate to socket 320 of straight duct 310, plug 314 changes appearance to indicate to the user that plug 314 is within range of socket 320. In addition, socket 320 can also change appearance to indicate that socket 320, not socket 322, is the intended target for plug 314.

Figure 3H:
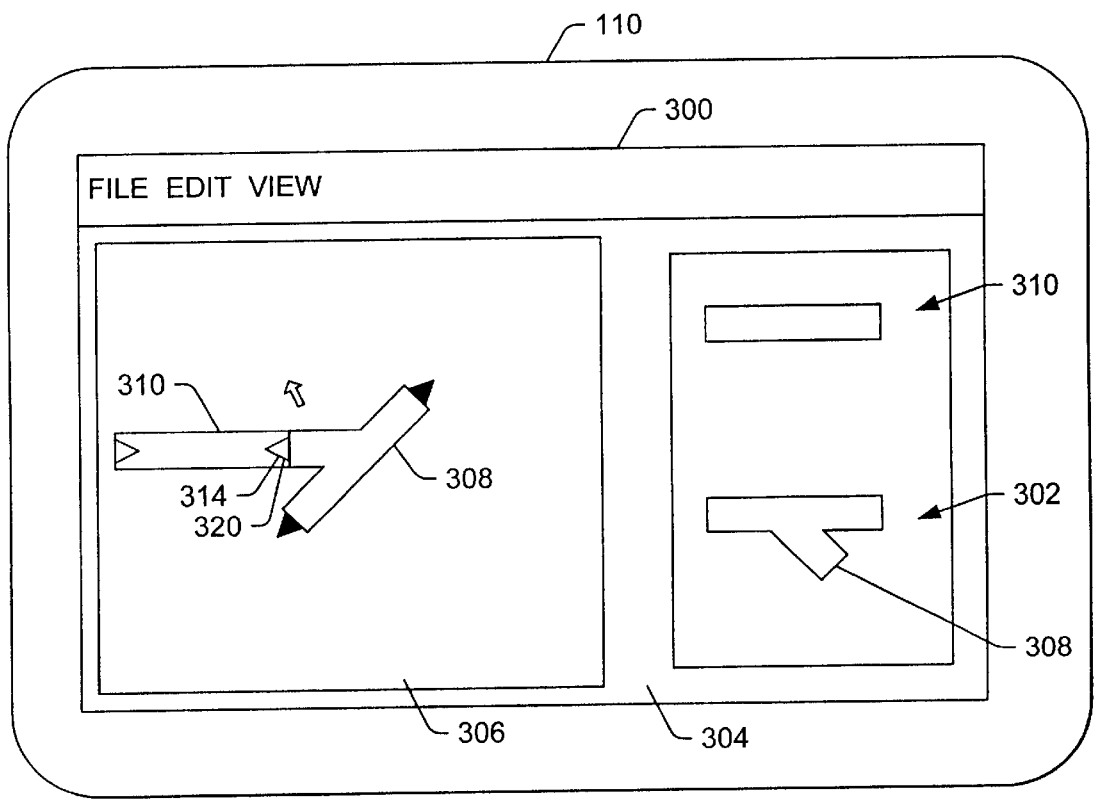

As shown in FIG. 3H, t-shaped duct 308 rotates to automatically align plug 314 with socket 320 of straight duct 310. This automatic orientation is an example of the "intelligence" that may be provided plugs 206 and sockets 208. The rotation tool on the toolbar was not used to perform the rotation of t-shaped duct 308; instead, the t-shaped duct 308 "knew" to rotate itself and automatically align plug 314 with socket 320.

Figure 3I:
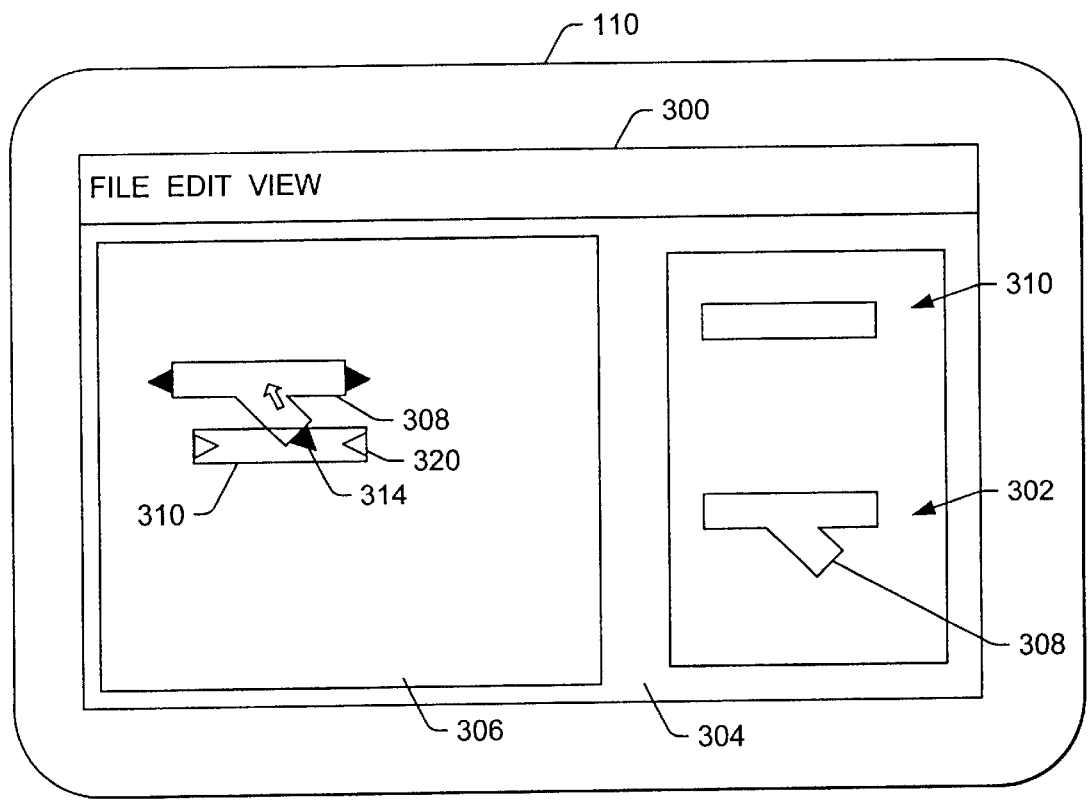

In FIG. 3I, as t-shaped duct 308 is dragged past straight duct 310, such that plug 314 is no longer in range of socket 320, t-shaped duct automatically re-orients itself to its original orientation when dragged from window 302.

Logic of the Plugs and Sockets

Figure 4:
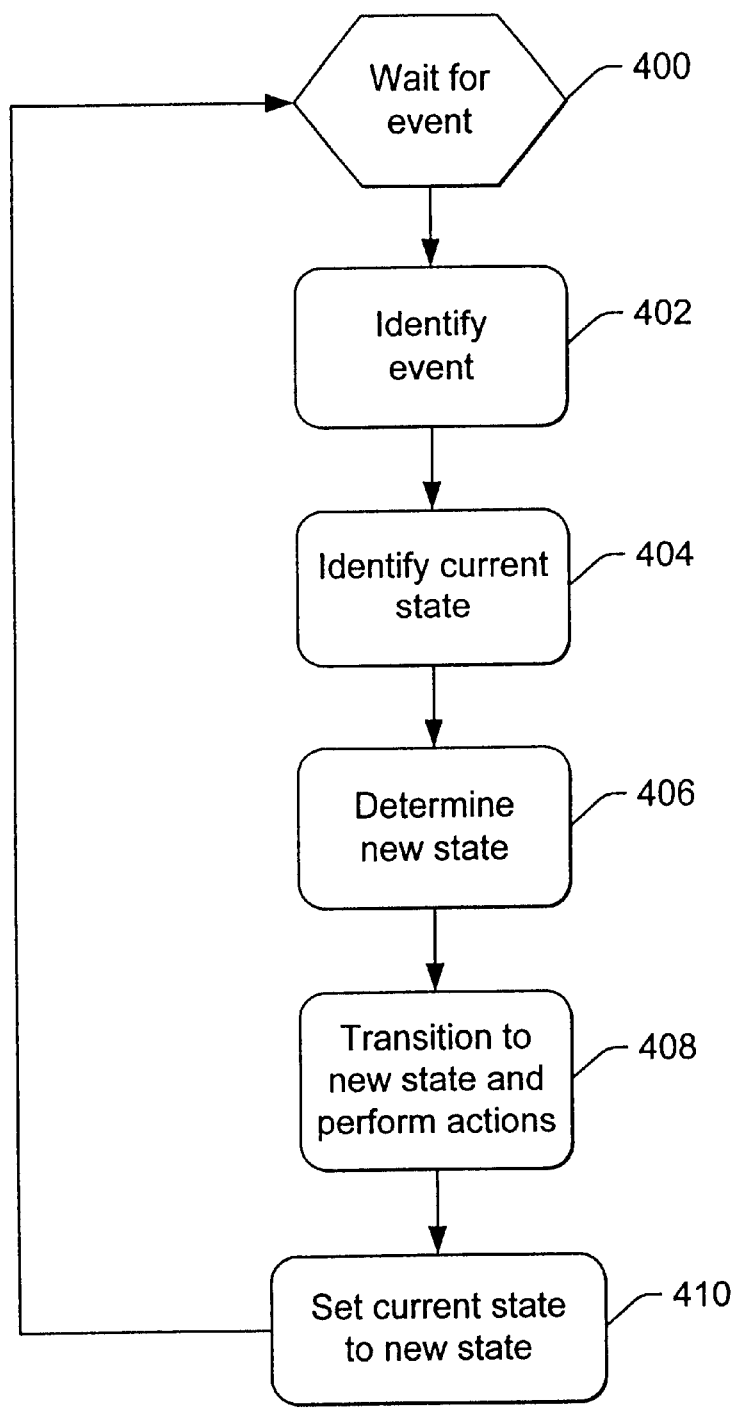
FIG. 4 is a flowchart that illustrates the general logic of a message or event-driven computer system performing the steps of the present invention.
Figure 5:
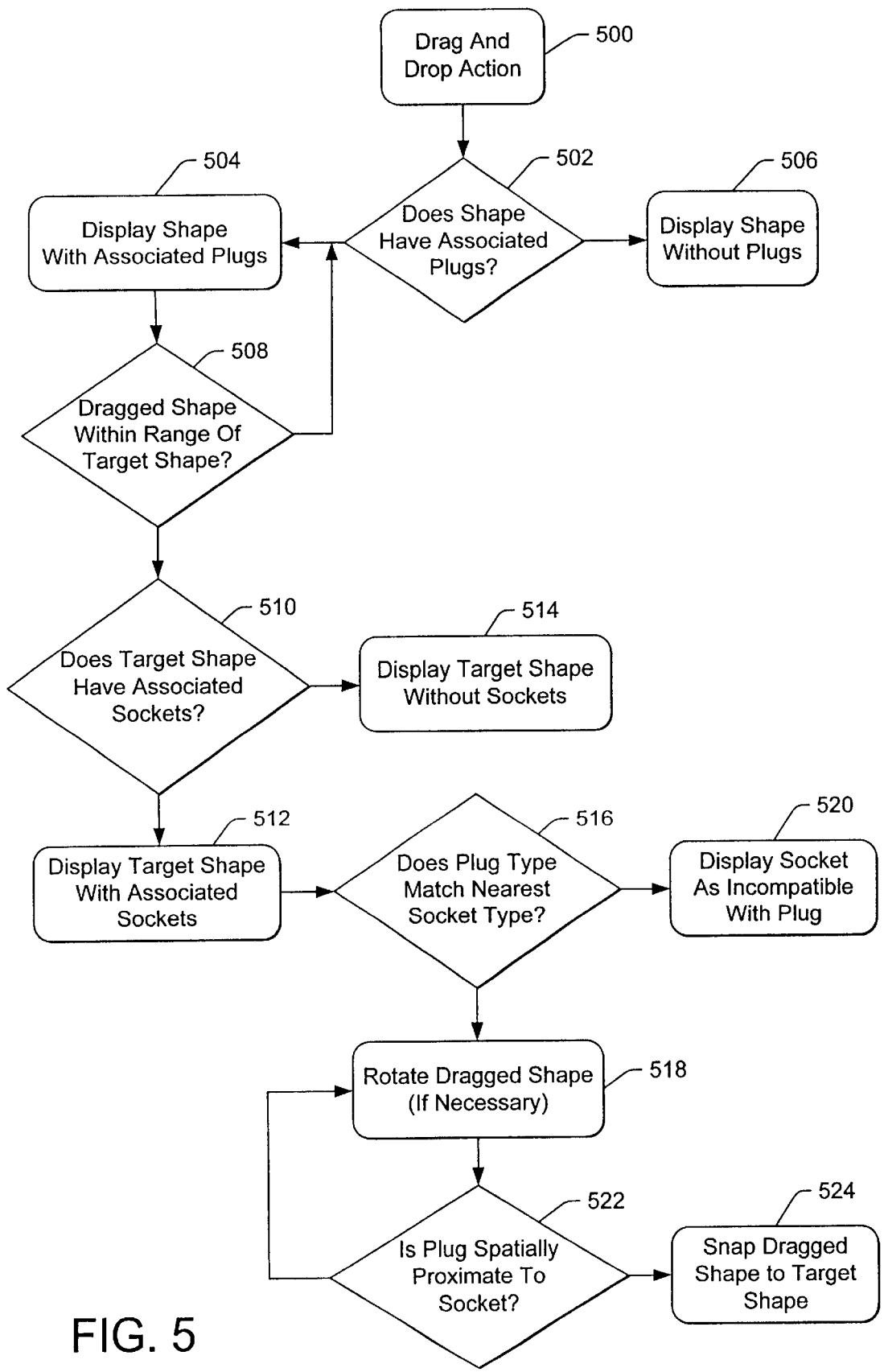
FIG. 5 is a flowchart that illustrates the general logic that is performed to determine whether to display the plugs and sockets of the present invention.

FIGS. 4 and 5 are flowcharts that illustrate the logic of the plugs 206 and sockets 208 of intelligent shape objects 200 according to the present invention. This logic is provided for illustrative purposes only, and different logic may be used to accomplish the same results.

In the preferred embodiment, the various operations described below are specifically related to the plugs 206 and sockets 208 of the present invention. Those skilled in the art will recognize that the use of the intelligent shape objects 200 with different application programs 118 may result in the different operations, or potentially the same operations.

FIG. 4 is a flowchart that illustrates the general logic of a message or event driven application program 118 performing the steps of the present invention. In such an application program 118, operations are performed when transitions are made, based upon the receipt of messages or events, from present or current states to new states.

Generally, the flowchart begins by waiting at block 400 for an event (e.g., a mouse button click). It should be appreciated that during this time, other operating system 116 tasks, e.g., file, memory, and video tasks, etc., may also be carried out. When an event occurs, control passes to block 402 to identify the event. Based upon the event, as well as the current state of the system determined in block 404, a new state is determined in block 406. In block 408, the logic transitions to the new state and performs any actions required for the transition. In block 410, the current state is set to the previously determined new state, and control returns to block 400 to wait for more input events.

The specific operations that are performed by block 408 when transitioning between states will vary depending upon the current state and the event. The various operations required to implement and maintain the intelligent shape objects 200 of the present invention represent particular events handled by the logic. However, it should be appreciated that these operations represent merely a subset of all of the events handled by the application program 118.

FIG. 5 is a flowchart that illustrates the general logic that is performed to determine whether to display the plugs 206 and sockets 208 of the present invention.

The logic begins at block 500 when an shape object 200 is selected by a user and dragged from the library window 302 to the working space window 304. Alternatively, block 500 can represent a user selecting a shape object 200 within working space window 304 and moving the shape object 200 to a new position within working space window 304.

Block 502 is a decision block that represents the application program 118 determining whether there are plugs 206 associated with the selected shape object 200. If so, control transfers to Block 504; otherwise, control transfers to Block 506.

Block 504 represents the application program 118 displaying the selected shape object 200 on the monitor 110 with the associated plugs 206.

Block 506 represents the application program 118 displaying the selected shape object 200 on the monitor 110 without any plugs 206, and all other shape objects 200 with sockets will be displayed without sockets 208, since there are no plugs 206 for mating the dragged part.

Block 508 is a decision block that represents the application program 118 determining whether the dragged shape object 200 with associated plugs 206 is dragged spatially proximate to a target shape object 200. This can occur when a user drags a shape object 200 from library window 302 to the working space window 304, or when a user selects a shape object 200 within working space window 304 and moves the shape object 200 to a new position within working space window 304. If so, control transfers to block 510; if not, control returns to block 504.

Block 510 is a decision block that represents the application program 118 determining whether there are sockets 208 associated with the target shape object 200. If so, control transfers to Block 512; otherwise, control transfers to Block 514.

Block 512 represents the application program 118 displaying the target shape object 200 on the monitor 110 with the associated sockets 208.

Block 514 represents the application program 118 displaying the target shape object 200 on the monitor 110 without any sockets 208.

Block 516 is a decision block representing the application program 118 determining whether the plug 206 of the selected shape object 200 matches the socket 208 of the target shape object 200. If so, control passes to block 518; if not, control passes to block 520.

Block 518 represents the application program 118 rotating the selected shape object 200 if necessary to align the plug 206 of the selected shape object 200 to the socket 208 of the target shape object 200.

Block 520 represents the application program 118 displaying the socket 208 of the target shape object 200 as incompatible with the plug 206 of the selected shape object 200. This can be performed by showing the socket 208 in a different color, by changing the appearance of the socket 208, by having the socket 208 keyed by shape object 200, or by inhibiting the display of an incompatible socket 208 for the target shape object 200. Many other methods of illustrating incompatibility to the user are envisioned, and the examples included herein are for illustration only and not meant to limit the scope of the present invention.

Block 522 is a decision block representing the application program 118 determining whether the plug 206 of the selected shape object 200 is spatially proximate to the socket 208. If so, control passes to block 524; if not, control returns to block 518.

Block 524 represents the application program 118 snapping or snapping and gluing the selected shape object 200 to the target shape object 200, wherein the plug 206 of the selected shape object 200 is aligned with the socket 208 of the target shape object 200.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

Those skilled in the art will recognize that additional functions may also be implemented using the intelligent shape objects, plugs and sockets of the present invention. In addition, the plugs and sockets and intelligent shapes can be integrated closely with each application program by any number of different methods.

In summary, the present invention discloses a method, apparatus, and article of manufacture for executing intelligent shape programming in a computer within a CAD application program, wherein the intelligent shape programming selectively displays informational aids associated with a displayed shape on the monitor of the computer to assist a user in manipulating the shape while operating one or more functions of the CAD application program. When invoked, the intelligent shape programming displays plugs and sockets related to the selected shape and the target shape on the monitor and aids the user in connecting a selected shape to a target shape.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of displaying information in a computer-aided drafting (CAD) application program on a monitor attached to a computer, comprising:
   (a) displaying a first object in the CAD application program on the monitor;
   (b) displaying a second object in the CAD application program on the monitor;
   (c) connecting the first object with the second object using a plug on the first object and a socket on the second object, wherein the plug and socket enable geometric and logical connections between the first and second objects.

2. The method of claim 1, wherein the plug enables one side of the connection, and the socket enables another side of the connection.

3. The method of claim 1, wherein the plug and socket comprise specific types of mating connectors.

4. The method of claim 1, wherein the plug and socket assist in positioning the first and second objects relative to one another.

5. The method of claim 1, wherein the plug and socket have orientation properties that allow for directed interaction between the first and second objects.

6. The method of claim 1, wherein the plug and socket have direction properties that allow for directed interaction between the first and second objects.

7. The method of claim 1, wherein the plug and socket have programmable properties that allow for directed interaction between the first and second objects.

8. The method of claim 1, wherein the plug automatically orients the first object so that it connects to the second object properly.

9. The method of claim 1, wherein the socket automatically orients the second object so that it connects to the first object properly.

10. The method of claim 1, wherein the plug and socket automatically rotate the first and second objects to fit properly together.

11. The method of claim 1, further comprising editing the plug and socket properties.

12. A computer-implemented apparatus for displaying information in a computer-aided drafting (CAD) application program, comprising:
   (a) a computer having a monitor attached thereto, wherein the CAD application program is executing on the computer;
   (b) means, performed by the CAD application program; in the computer, for displaying a first object on the monitor;
   (c) means, performed by the CAD application program in the computer, for displaying a second object on the monitor;
   (d) means, performed by the CAD application program in the computer, for connecting the first object with the second object using a plug on the first object and a socket on the second object, wherein the plug and socket enable geometric and logical connections between the first and second objects.

13. The apparatus of claim 12, wherein the plug enables one side of the connection, and the socket enables another side of the connection.

14. The apparatus of claim 12, wherein the plug and socket comprise specific types of mating connectors.

15. The apparatus of claim 12, wherein the plug and socket assist in positioning the first and second objects relative to one another.

16. The apparatus of claim 12, wherein the plug and socket have orientation properties that allow for directed interaction between the first and second objects.

17. The apparatus of claim 12, wherein the plug and socket have direction properties that allow for directed interaction between the first and second objects.

18. The apparatus of claim 12, wherein the plug and socket have programmable properties that allow for directed interaction between the first and second objects.

19. The apparatus of claim 12, wherein the plug automatically orients the first object so that it connects to the second object properly.

20. The apparatus of claim 12, wherein the socket automatically orients the second object so that it connects to the first object properly.

21. The apparatus of claim 12, wherein the plug and socket automatically rotate the first and second objects to fit properly together.

22. The apparatus of claim 12, further comprising editing the plug and socket properties.

23. An article of manufacture comprising a computer program carrier readable by a computer and embodying one or more instructions executable by the computer to perform method steps of displaying information in a computer-aided drafting (CAD) application program on a monitor attached to the computer, the method comprising:

(a) displaying a first object in the CAD application program on tie monitor;

(b) displaying a second object in the CAD application program on the monitor;

(c) connecting the first object with the second object using a plug on the first object and a socket on the second object, wherein the plug and socket enable geometric and logical connections between the first and second objects.

24. The article of manufacture of claim 23, wherein the plug enables one side of the connection, and the socket enables another side of the connection.

25. The article of manufacture of claim 23, wherein the plug and socket comprise specific types of mating connectors.

26. The article of manufacture of claim 23, wherein the plug and socket assist in positioning the first and second objects relative to one another.

27. The article of manufacture of claim 23, wherein the plug and socket have orientation properties that allow for directed interaction between the first and second objects.

28. The article of manufacture of claim 23, wherein the plug and socket have direction properties that allow for directed interaction between the first and second objects.

29. The article of manufacture of claim 23, wherein the plug and socket have programmable properties that allow for directed interaction between the first and second objects.

30. The article of manufacture of claim 23, wherein the plug automatically orients the first object so that it connects to the second object properly.

31. The article of manufacture of claim 23, wherein the socket automatically orients the second object so that it connects to the first object properly.

32. The article of manufacture of claim 23, wherein the plug and socket automatically rotate the first and second objects to fit properly together.

33. The article of manufacture of claim 23, further comprising editing the plug and socket properties.

* * * * *

UNITED STATES PATENT AND TRADEMARK OFFICE
CERTIFICATE OF CORRECTION

PATENT NO. : 6,717,587 B2  Page 1 of 1
DATED : April 6, 2004
INVENTOR(S) : Lawrence D. Felser and John R. Wallace It is certified that error appears in the above-identified patent and that said Letters Patent is hereby corrected as shown below:

Column 6,
Line 52, after "316," insert -- or --.
Line 53, "socket" should read -- sockets --.

Column 7,
Line 15, "210" should read -- 310 --.

Signed and Sealed this

Seventeenth Day of May, 2005

JON W. DUDAS
*Director of the United States Patent and Trademark Office*